Jan. 16, 1934.  S. W. HYATT  1,943,609
AIRPLANE LANDING LIGHT
Filed Oct. 3, 1932
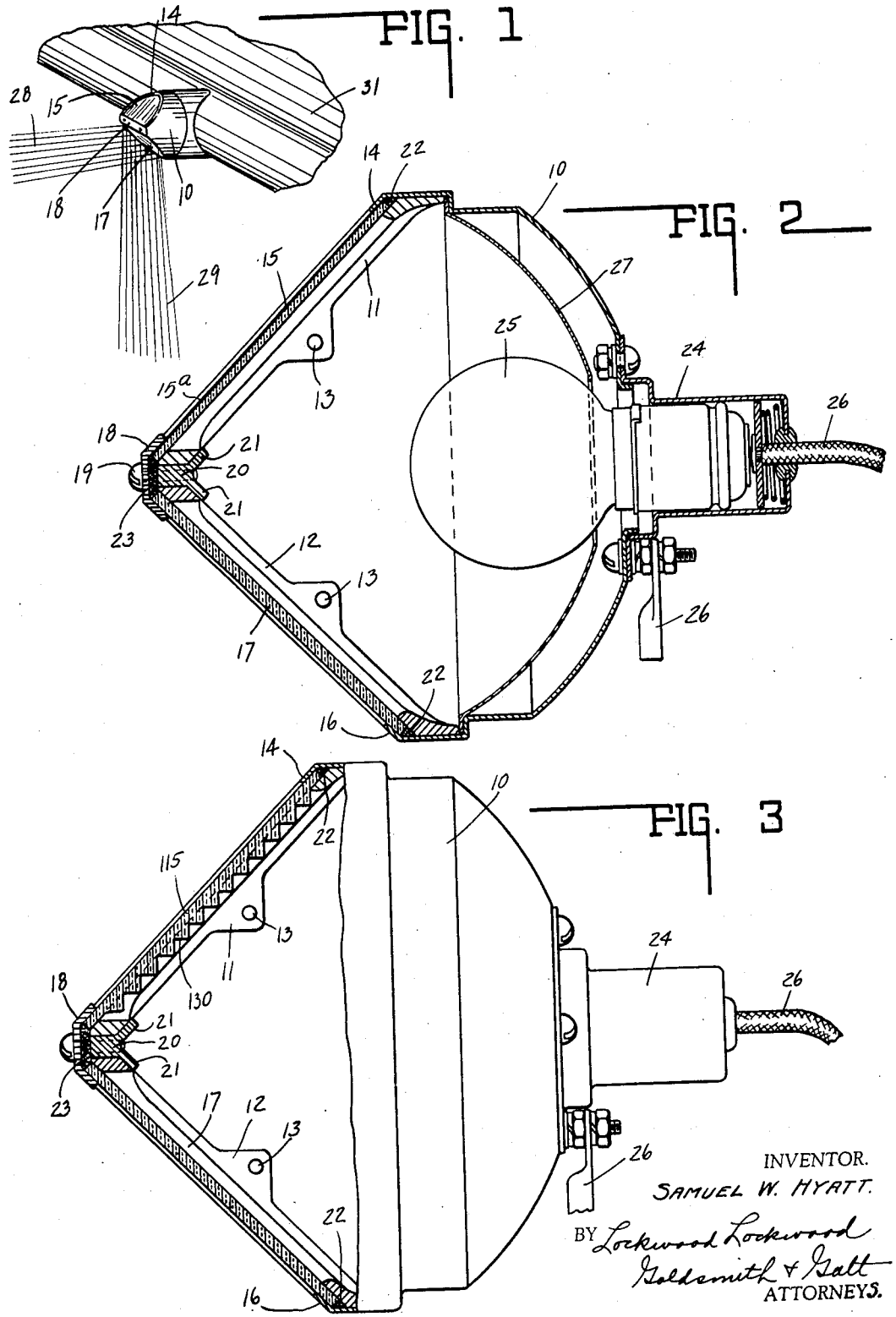
INVENTOR.
SAMUEL W. HYATT.
BY Lockwood Lockwood
Goldsmith & Gatt
ATTORNEYS.

Patented Jan. 16, 1934

1,943,609

UNITED STATES PATENT OFFICE 1,943,609

AIRPLANE LANDING LIGHT

Samuel W. Hyatt, Columbus, Ohio

Application October 3, 1932. Serial No. 635,912

4 Claims. (Cl. 240—7.7)

This invention relates to an airplane landing light.

In making a night landing, it is important that the pilot of an airplane be able to see the area directly ahead of his ship and the area directly beneath as well. Heretofore, movable lights have been used for this purpose by means of which the pilot could move the entire lamp to direct its beam either forwardly or downwardly as desired. This has required the manipulation by the pilot of some form of control means during the difficult operation of landing, with a consequent dangerous diversion of the pilot's attention between his light controls and his ship controls.

One object of the present invention is to provide a single light by means of which a beam of light may be directed forwardly in the path of travel of the airplane and another beam may be directed downwardly toward the ground and in which no manipulation of a light control is necessary. The light is so arranged that the forward beam and the downward beam are simultaneously projected.

Another object of the invention is to so form the light that air resistance is a minimum. Heretofore the flat face of the lens of a landing light has caused considerable air resistance to the movement of the airplane. This has been partially overcome in some cases by mounting the lamp within a recess in the wing or fuselage of an airplane and only moving it out into illuminating position when illumination was necessary, so that the excess air resistance is only encountered during landing. Here again however the pilot is required to divide his attention between light control and ship control. In the present invention, the lamp is always mounted in illuminating position but the form thereof and the position of the lens is such as to present a minimum of air resistance at all times.

Other objects and features of the invention will be understood from the accompanying drawing and the following specification and claims:

In Figure 1 there is shown the improved landing light mounted upon the leading edge of an airplane wing. Figure 2 is a vertical central section through one form of the landing light. Figure 3 is a similar section through another form thereof.

The light consists of a casing 10, the forward portion of which has the V-shaped form best illustrated in Figure 1. Within the forward portion of the casing 10 there is fastened an upper frame member 11 and a lower frame member 12, preferably light aluminum castings riveted to the casing 10 by means of rivets 13. The casing 10 is formed with a lip 14 on the upper portion of its forward face which overlaps the frame casting 11 and is spaced therefrom to provide a recess for receiving a mirror 15 having an outline in the form of a half ellipse and having the usual reflecting surface 15a. The lower portion of the forward face of the casing 10 is provided with a similar lip 16 forming with the casting 12 a recess for receiving a lens 17, also having its outline in the form of a half ellipse. The mirror 15 and the lens 17 are inserted by sliding the same upwardly and downwardly respectively in the said grooves. A narrow cap member 18 is fitted over the adjacent edges of the mirror 15 and lens 17 and is held in place by screws 19 threadedly engaging a nut 20 having outwardly flanged portions 21 engaging the inner edges of the frame castings 11 and 12. Packing material 22 is placed about the outer surface of the mirror 15 and lens 17 and packing material 23 is placed immediately behind the cap member 18 to prevent rattling and breakage of said mirror and lens.

At the rear of the casing 10 there is mounted a lamp socket 24 carrying a lamp 25 supplied with electric current in the conventional manner by conductors 26. A reflector 27 is mounted within the casing 10 at the rear of the lamp 25 and is of the usual substantially parabolic form which is adapted to project the light from the lamp in the form of a beam of substantially parallel rays.

In the operation of this form of the light, the portion of the beam of light reflected from the lower half of the reflector 27 passes through the lens 17 in the direction of travel of the airplane as indicated at 28 in Figure 1. The portion of the beam reflected from the upper half of the reflector 27 strikes the mirror 15 and is reflected downwardly through the lens 17, as shown at 29 in Figure 1. In this manner, a single light without manipulation of any control mechanism by the pilot supplies a forwardly and a downwardly directed beam of light. The pilot can, therefore, see everything that is ahead of him or below him without being distracted by the operation of any control mechanism during the difficult maneuver of making a night landing. The V-shaped form of the forward surface of the light, both the upper and the lower portions of which are inclined to the direction of travel of the airplane, reduces the air resistance of the light to a minimum and this air resistance is always the same either in flight or in landing.

In the alternative form of the invention shown in Figure 3, the mirror 15 is replaced by a lens 115, the remainder of the light being similar in all respects to that shown in Figure 2. The lens 115 is provided with corrugations 130 on its inner surface which act as prisms to deflect the beam of light from the upper portion of the reflectors 27 downwardly through the lens 17. Herein these corrugations are shown as rectangular in section but the exact shape thereof will be determined by the index of refraction of the particular glass being used to direct the light in the downward direction desired.

In Figure 1 the light is shown mounted on the leading edge of an airplane wing 31. While this is a preferred position for the lamp, it may be mounted on any other convenient part of the airplane. It is to be noticed also that the mirror 15 and the lens 17 are interchangeable. If desired, a clear lens may be placed in both the upper and the lower positions to give a full beam of light forward. When this is done, the light does not have the advantage of illuminating the area directly beneath the airplane but still has the advantage of minimum air resistance. It is also to be noted that with the lens 17 in its inclined position, rays of light may pass directly from the lamp 25 without reflection from the reflector 27 and these rays illuminate, to a certain extent, the area between the beams 28 and 29. While the lens 17 shown herein is illustrated as a clear lens, it is evident that a ribbed or faceted lens may be used to spread the beams 28 and 29 laterally, as desired. Other variations in the exact detail herein shown may be made without departing from the scope of the invention as set forth in the appended claims.

The invention claimed is:

1. In an airplane landing light, the combination of a lamp casing having a forward portion with an upwardly and rearwardly inclined upper face and a downwardly and rearwardly inclined lower face, a lamp in said casing, a reflector in said casing directing light from said lamp in a beam toward said forward casing portion, a lens in the lower face of said forward portion permitting passage of a portion of said beam without substantial apparent change of direction as viewed in side elevation, and means mounted in said upper face for intercepting another portion of said beam and for redirecting the same downwardly through said lens, said means being formed to maintain said portion in a beam of apparently substantially parallel rays as viewed in side elevation and said lens being formed to permit passage thereof without substantial apparent change of direction as viewed in side elevation.

2. In an airplane landing light, the combination of a lamp casing having a forward portion with an upwardly and rearwardly inclined upper face and a downwardly and rearwardly inclined lower face, a lamp in said casing, a reflector in said casing directing light from said lamp in a beam toward said forward casing portion, a lens in the lower face of said forward portion permitting passage of a portion of said beam without substantial apparent change of direction as viewed in side elevation, and a flat reflector mounted in said upper face for intercepting another portion of said beam and for redirecting the same downwardly through said lens, said lens being formed to permit passage of the second portion of said beam without substantial apparent change of direction as viewed in side elevation.

3. In an airplane landing light, the combination of a lamp casing having a forward portion with an upwardly and rearwardly inclined upper face and a downwardly and rearwardly inclined lower face, a lamp in said casing, a reflector in said casing directing light from said lamp in a beam toward said forward casing portion, a lens in the lower face of said forward portion permitting passage of a portion of said beam without substantial apparent change of direction as viewed in side elevation, and prism means mounted in said upper face for intercepting another portion of said beam and for redirecting the same downwardly through said lens, said prism means being formed to maintain said portion in a beam of substantially parallel rays as viewed in side elevation and said lens being formed to permit passage thereof without substantial apparent change in direction as viewed in side elevation.

4. In an airplane landing light, the combination of a lamp casing having a forward portion with an upwardly and rearwardly inclined upper face and a downwardly and rearwardly inclined lower face, a lamp in said casing, a reflector in said casing directing light from said lamp in a beam toward said forward casing portion, a lens in the lower face of said forward portion permitting passage of a portion of said beam without substantial apparent change of direction as viewed in side elevation, means mounted in said upper face for intercepting another portion of said beam and for redirecting the same downwardly through said lens, said means being formed to maintain said portion in a beam of apparently substantially parallel rays as viewed in side elevation and said lens being formed to permit passage thereof without substantial apparent change of direction as viewed in side elevation, and a mounting for said casing forwardly of the leading edge of an airplane wing whereby the first portion of the beam illuminates the area ahead of the same while the second portion illuminates the area beneath the same without interference by said wing.

SAMUEL W. HYATT.